United States Patent
Ernst et al.

(10) Patent No.: US 11,337,290 B2
(45) Date of Patent: May 17, 2022

(54) CONTROLLING A WIRELESS ACCESS POINT OF A BUILDING

(71) Applicant: OSRAM GmbH, Munich (DE)

(72) Inventors: Herbert Ernst, Weilheim (DE); Michael Eschey, Wehringen (DE); Holger Sacher, Augsburg (DE); Volker Kamp, Feldkirchen (DE); Markus Jung, Feldkirchen (DE)

(73) Assignee: OSRAM GmbH, Munich (DE)

( * ) Notice: Subject to any disclaimer, the term of this patent is extended or adjusted under 35 U.S.C. 154(b) by 11 days.

(21) Appl. No.: 16/766,302

(22) PCT Filed: Nov. 27, 2018

(86) PCT No.: PCT/EP2018/082625
§ 371 (c)(1),
(2) Date: May 22, 2020

(87) PCT Pub. No.: WO2019/110362
PCT Pub. Date: Jun. 13, 2019

(65) Prior Publication Data
US 2020/0374796 A1     Nov. 26, 2020

(30) Foreign Application Priority Data

Dec. 4, 2017   (DE) ..................... 10 2017 221 767.7

(51) Int. Cl.
     *H05B 47/19*      (2020.01)
     *H04W 4/029*      (2018.01)
     (Continued)

(52) U.S. Cl.
     CPC ............ *H05B 47/19* (2020.01); *H04W 4/029* (2018.02); *H04W 52/0206* (2013.01); *H05B 47/115* (2020.01)

(58) Field of Classification Search
CPC ..... H05B 47/19; H05B 47/115; H04W 4/029; H04W 52/0206; Y02B 20/40
See application file for complete search history.

(56) References Cited

U.S. PATENT DOCUMENTS 6,097,290 A * 8/2000 Balfour ................ H05B 47/115
                                                        340/545.1
RE48,299 E * 11/2020 Sibert .................. H05B 47/175
(Continued)

FOREIGN PATENT DOCUMENTS

GB         2491895 A     12/2012
WO    2017134091 A1     8/2017

OTHER PUBLICATIONS

International Search Report issued for the corresponding PCT application No. PCT/EP2018/082625, dated Feb. 28, 2019, 16 pages (for informational purpose only).

*Primary Examiner* — Brandon J Miller
(74) *Attorney, Agent, or Firm* — Viering, Jentschura & Partner MBB

(57) ABSTRACT

A method for controlling at least one wireless network access point in a building may include detecting whether a wireless communication device is connected to at least one wireless network access point and/or whether a person is present using a group of presence detectors. An illumination system may include at least one wireless network point and/or the group of presence detectors. An activated network access point may remain activated when the wireless network access point is connected to a wireless communication device and/or when a person is present. A network access point may be automatically deactivated when the wireless network access point is not connected to a wireless communication device and/or when a person is not present. A deactivated network access point may be automatically reactivated when the wireless network access point is con- (Continued)

nected to a wireless communication device and/or when a person is present. Combinations thereof are also possible.

14 Claims, 3 Drawing Sheets

(51) Int. Cl.
    *H05B 47/115*     (2020.01)
    *H04W 52/02*     (2009.01)

(56) References Cited

U.S. PATENT DOCUMENTS

| | | | |
|---|---|---|---|
| 2009/0310577 A1* | 12/2009 | Kiribayashi | H04W 84/12 370/338 |
| 2010/0117820 A1* | 5/2010 | Mitschele | G08G 1/147 340/539.1 |
| 2015/0334809 A1* | 11/2015 | Mans | H05B 47/11 315/151 |
| 2017/0013417 A1 | 1/2017 | Zampini, II | |
| 2017/0265280 A1* | 9/2017 | Setomoto | F21V 21/14 |

\* cited by examiner

CONTROLLING A WIRELESS ACCESS POINT OF A BUILDING

CROSS-REFERENCE TO RELATED APPLICATIONS

The present application is a national stage entry according to 35 U.S.C. § 371 of PCT application No.: PCT/EP2018/082625 filed on Nov. 27, 2018; which claims priority to German Patent Application Serial No.: 10 2017 221 767.7 filed on Dec. 4, 2017; all of which are incorporated herein by reference in their entirety and for all purposes.

TECHNICAL FIELD

The present disclosure relates to a method for controlling at least one wireless network access point which is installed in a building. The present disclosure also relates to an illumination system which features at least one central entity which is communicatively coupled to at least one group of presence detectors and to at least one network access point, and which is configured to receive detection data of at least one presence detector in the group. The present disclosure also relates to a luminaire which features at least one presence detector and at least one wireless network access point and which is configured to carry out the method autonomously. The present disclosure furthermore relates to a lamp which features at least one presence detector and at least one wireless network access point and which is configured to carry out the method autonomously.

BACKGROUND

Buildings are known which are equipped with an illumination system which features a plurality of controllable luminaires and typically a plurality of presence detectors. For saving energy, a luminaire or the light sources thereof are automatically switched on by means of the illumination system only if it has been detected by means of one or a plurality of presence detectors that a person is in its vicinity. If the person leaves the vicinity of the luminaire (and no other persons are near it), this in turn being detected by the presence detectors, this luminaire or the light sources thereof are automatically switched off via the illumination system.

In the building, one or a plurality of wireless network access points may also be present, in order to make it possible for a wireless communication device to be connected or communicatively coupled to a network. The network access points are typically integrated into a network structure of the building, said structure often being referred to as a building IT network.

Today, substantial efforts are being undertaken to reduce energy consumption of a building. However, this is made more difficult by the fact that in modern building infrastructures, which comprise the illumination system and the network structure, there is a tendency to use an increasing number of electrical loads. In particular, a level of networking is increasing, since an increasing number of wireless network access points are being installed.

The object of the present disclosure is to overcome the disadvantages of the prior art at least partially, and in particular to provide an improved possibility of reducing energy consumption of the building.

SUMMARY

This object is achieved according to the features of the independent claims. Non-limiting embodiments may be extracted in particular from the dependent claims.

The object is achieved via a method for controlling at least one wireless network access point which is installed in a building, in which
- an activated network access point remains activated if the network access point is connected to a wireless communication device, and/or
- an activated network access point remains activated if a person is detected by means of a group of presence detectors of an illumination system of the building, said group being associated with the network access point; otherwise, the network access point is deactivated, and
- a deactivated network access point is activated if a person is detected by means of the group of presence detectors, i.e., if one or a plurality (if present) of the presence detectors detects a person.

This method results in the advantage that wireless network access points may also be selectively activated and deactivated as a function of the presence of a person and as a function of an existence of an existing connection or use by a wireless communication device. As a result, substantial energy savings may be achieved, in particular if only a few persons are in a building.

A further advantage is that the building IT network cannot be attacked or "hacked" from the outside via deactivated access points, thus increasing security of the building IT network.

In addition, this method is may be advantageously implemented in a comparatively economical manner, since at least some of the presence detectors are provided via an existing illumination system. In the method, at least some of these presence detectors of the illumination system are thus additionally used to activate and deactivate wireless network access points in a targeted manner. As a result, the illumination system and the network structure of the building infrastructure are functionally linked to one another.

A wireless access point may be understood in particular to be an electronic device which acts as or is configured as an interface for wireless communication devices. These wireless communication devices can establish a wireless communication link to a network access point via a wireless adapter. The network access point may be connected to a fixedly installed communication network, for example, via a cable or the power grid. For example, wireless network access points can connect mobile user terminal devices such as notebooks, smartphones, etc., having an integrated wireless adapter, to a local area network (LAN) or another wired data network (for example, to a telephone network, cable television network etc.), via WLAN.

In one refinement, the wireless network access point is a WLAN-compatible wireless network access point, which may also be referred to as a WLAN access point. If it is Wi-Fi-certified, the WLAN access point may also be referred to as a Wi-Fi access point. However, all other suitable types of wireless network access points having different or additional access protocols and/or connection standards may generally be used, for example, Bluetooth access points or other radio-based network access points.

An activated network access point may be understood to mean a network access point which is ready for wireless communication with a wireless communication device.

A deactivated network access point may be understood to mean a network access point which is not ready for wireless communication with a wireless communication device. A deactivated network access point may be a switched-off access point, whereby particularly high energy savings may be achieved. However, a deactivated network access point may also be an access point which is in a quiescent state (for example, in a standby mode). A comparatively rapid transition to the active state ("wake-up") is thus made possible with substantial energy savings.

A plurality of wireless communication devices may be wirelessly connected to a same network access point. As long as only one of the communication devices is connected to the network access point, the network access point is not switched off.

In one refinement, the wireless communication device is a portable computer (for example, a notebook, a tablet etc.) and/or a mobile communication terminal device (for example, a smartphone, a phablet, etc.).

The fact that a group of presence detectors is associated with a network access point comprises in particular this network access point being activated and/or deactivated by means of at least one presence detector of this group, based on the detection of the presence of a person. In particular, only presence detectors of this group are used for activating and deactivating an associated network access point.

A presence detector may belong to one or a plurality of groups.

A group of presence detectors may comprise exactly one presence detector or a plurality of presence detectors.

One or a plurality of network access points may be associated with a group of presence detectors. If a plurality of network access points is associated with a group of presence detectors, all associated network access points may be deactivated by means of the method, thus saving a particularly large amount of energy. However, it is generally also possible that at least one network access point remains activated.

Generally, it may be provided that all network access points of a building can be selectively activated and deactivated according to the above method. Alternatively, at least one network access point of the building may not be associated with any group of presence detectors and thus cannot be activated and deactivated, at least by means of the above method.

A presence detector may be understood to mean a motion detector or a presence detector. While the motion detector can detect only movements of persons, but cannot detect any practically stationary objects, the presence detector can additionally or alternatively also detect the presence of practically stationary persons.

The presence detector may feature at least one sensor which operates actively via electromagnetic waves (HF or Doppler radar), via ultrasound (ultrasound motion detector), on the basis of light (for example, a light barrier), or passively using infrared radiation, wherein combinations thereof may also be provided. A presence detector may also feature a camera, wherein the images taken by said camera may be used, for example, for object recognition.

An evaluation circuit for evaluating the sensor signals generated by the at least one sensor may be integrated into the presence detector.

The presence detector is in particular network-capable, in particular wirelessly network-capable, for example, by providing a wireless network adapter.

The fact that a presence detector is a component of an illumination system of the building comprises this presence detector also being usable or being used for controlling a lighting function of the illumination system.

The fact that a network access point is automatically activated or deactivated comprises in particular said network access point not being activated or deactivated manually, but rather, for example, by means of the building infrastructure.

Thus, in the above method, in particular the following scenarios may exist:

1) The presence of (at least) one person is detected or determined by a group of presence detectors, and the associated network access point is connected to a wireless communication device. In this case, the at least one network access point which is associated with the group remains activated, because it is currently being used.

2) The presence of (at least) one person is detected by the group of presence detectors, but the associated network access point is not connected to any wireless communication device. In this case, the network access point also remains activated, for example, because it may be that a person would like to connect a wireless communication device briefly with the network.

3) No presence of any person is detected by the group of presence detectors, but the network access point is connected to a wireless communication device. In this case, the network access point also remains activated, for example, because it is currently being used. This case may exist, for example, if a switched-on wireless communication device remains in a communication range of the associated network access point, for example, in order to download data from the network or to upload data to the network.

4) The group of presence detectors does not detect the presence of any person, and the network access point is not connected to any wireless communication device. In this case, the network access point is deactivated, possibly after a predetermined time delay.

5) If the associated group of presence detectors does not detect the presence of any person in the case of a switched-off network access point, the network access point is kept deactivated.

6) If the associated group of presence detectors detects the presence of a person in the case of a switched-off network access point, the network access point is reactivated.

In one embodiment, at least one network access point is situated in a room of the building and is activated if it is detected by means of the group of presence detectors that a person is in this room.

In one refinement, all presence detectors in the group are in the room. Alternatively, at least one presence detector in the group may be arranged outside the room.

In another refinement, all network access points situated in a room are activated and deactivated together.

In one embodiment, at least one network access point is situated in a room of the building and is activated if it is detected by means of the group of presence detectors that a person approaches this room or an entrance to this room from the outside. As a result, the advantage is achieved that a particularly large amount of time remains to activate the at least one wireless access point which is situated in the room. In this embodiment, at least one presence detector in the group may be arranged outside the room in an entrance area to the room or may be directed into the entrance area. The entrance area itself may be a room, a corridor, a stairwell, a building atrium, etc.

In another embodiment, the at least one group of presence detectors transmits detection data to a central entity, and the central entity activates or deactivates at least one network access point, based the received detection data. It is thus possible to provide particularly varied control options. In addition, it is particularly simple to monitor the individual components and their states.

Detection data may in particular be understood to mean data which are derived from sensor signals of the presence detectors and which represent a "person absent" or "person present" state. In one variant, detection data are transmitted only if a person is or has been detected.

In one embodiment,
the illumination system features at least one wirelessly communicating luminaire and/or lamp, into which a wireless network access point is integrated which can be activated and deactivated by means of the luminaire and/or lamp,
the group of presence detectors which is associated with the network access point respectively transmits detection data wirelessly which are received by the at least one luminaire and/or lamp, and
the luminaire and/or lamp selectively activates and deactivates the network access point, based on the detection data, and based on a detection of a connection of its wireless network access point to a wireless communication device, as described above.

This may be implemented in particular in such a way that if the detection data indicate the presence of a person, the luminaire and/or lamp then switches on its lamp(s) or its light source(s), and then, if the detection data do not indicate the presence of a person, switches off its lamp(s) or its light source(s). In addition to this lighting function, the luminaire and/or lamp may also detect whether a wireless communication device is connected to it, due to its wireless network access point. As a result, in addition to its lighting control, the luminaire and/or lamp may advantageously be used to implement the method as described above.

The object is also achieved via a building infrastructure, featuring an illumination system comprising at least one group of presence detectors for detecting the presence of a person, and featuring at least one wireless network access point which is associated with the group, wherein the building infrastructure is configured to carry out the method as described above.

The building infrastructure may be configured analogously to the method, and vice-versa, and features the same advantages. The building infrastructure may feature at least the illumination system and a building IT network which comprises the network access points.

In one refinement, the at least one network access point and at least a portion of the group of presence detectors are situated in a same room of the building. Thus, it is advantageously possible to achieve a targeted room-by-room activation and deactivation of network access points. If the group features a plurality of presence detectors, all or only some of the presence detectors may be arranged in the room or may monitor at least sub-areas of the room.

In one embodiment, the group of presence detectors features a plurality of presence detectors, the at least one associated network access point and a portion (subgroup) of the presence detectors are situated in the same room of the building, and another portion (subgroup) of the presence detectors is situated in an entrance area to the room. Thus, an approach by a person to the room may be reliably detected, whereby deactivated network access points have more time to start up.

In one embodiment, the building infrastructure features at least one central entity which is communicatively coupled to at least one group of presence detectors and to at least one wireless network access point, and which is configured to receive detection data of at least one presence detector in the group; to transmit control data to the at least one wireless network access point; and to selectively activate and deactivate the at least one wireless network access point, based on the detection data, according to the method as described above. This embodiment results in the advantage that particularly varied control options are provided which can be monitored in a simple manner and centrally adjusted.

The building infrastructure may feature exactly one central entity. The building infrastructure may alternatively feature multiple central entities which are responsible for portions of a building, for example, for different floors of a building. A central entity may also be responsible for a plurality of buildings or a building complex.

The central entity may be a control entity such as a central server. The central entity may be a control center of the building, may be connected to it, or may be integrated into it.

In one embodiment, the group of presence detectors and the at least one wireless network access point are integrated into a peer-to-peer network. This results in the advantage that it is possible to omit a central entity, thus reducing costs for the central entity and installation effort.

A peer-to-peer network may be understood to mean in particular a network which does not feature a central entity. In one variant, the network subscribers which are integrated into the peer-to-peer network may have equal priority and may demand services as well as provide them. In another variant, the network subscribers may be divided into different groups which perform specific tasks, as a function of their qualification.

In one embodiment, at least one presence detector is integrated into a luminaire and/or lamp of the illumination system. This enables a particularly simple and economical design of the illumination system. In addition, a particularly dense arrangement of presence detectors may thus be provided.

Alternatively, at least one presence detector may be an autonomous presence detector.

In one embodiment, at least one network access point is integrated into a luminaire and/or lamp of the illumination system. This also supports a particularly simple and economical design of the illumination system. In addition, a particularly dense arrangement of network access points may thus be provided with little installation effort. In addition, this embodiment facilitates a design of peer-to-peer networks.

The luminaire and/or lamp is in particular network-capable, and is also in particular independent of a state of a network access point which is possibly integrated into it. A network-capable luminaire may feature a network adapter for connecting to a network. The network adapter may be a wireless network adapter, for example, a WLAN adapter. A luminaire may feature and may selectively switch on and off one or a plurality of lamps. A lamp may also be network-capable as an autonomous component or device, analogously to a luminaire.

The network access point of the luminaire and/or lamp can in particular be activated and deactivated by means of the luminaire and/or lamp.

In one refinement, a plurality of such network-capable luminaires or lamps are connected to the group of presence detectors via a peer-to-peer network, or are integrated into a peer-to-peer network.

In particular for this case, in one refinement, all network-capable luminaires which receive detection data from the group of presence detectors activate or deactivate their network access point based on these received data. This also includes the case in which a presence detector is integrated into at least one luminaire and/or lamp.

However, it is also possible that the luminaires and/or lamps belonging to a particular group of presence detectors inform each other about the reception of detection data and/or about an existence of a connection to the wireless communication device, by means of the peer-to-peer network, or by means of a direct data connection, for example, in the form of an information chain. For example, a luminaire or lamp, of which the network access point is deactivated, may receive detection data via its network adapter to the effect that a person has been detected. This luminaire or lamp then activates its network access point, and informs one or a plurality of additional luminaires and/or lamps which belong to the same group of presence detectors (and which may or may not have received the detection data), that it has received corresponding detection data. The additional luminaires and/or lamps may then activate their respective network access point. This refinement features the advantage that it is thus not necessary to ensure that all luminaires and/or lamps are able to receive the detection data from all presence detectors in a group. The further advantage is achieved that, by means of the information chain or information transfer, network-capable luminaires and/or lamps which do not feature an integrated network access point (but rather, for example, provide a pure lighting function), can also be informed about the presence of persons. In addition, pure network access points which are without a lighting function, but which are network-capable independently of the network access point, may thus also be informed or controlled.

In one embodiment,
the illumination system features at least one luminaire and/or lamp into which a wireless network access point is integrated which can be activated and deactivated by means of the luminaire and/or lamp,
the group of presence detectors which is associated with the network access point is respectively configured to transmit detection data wirelessly which can be received by the at least one luminaire and/or lamp, and
the luminaire and/or lamp is configured to selectively activate and deactivate the network access point, based on the detection data as described above, selectively based on the detection data, and based on a detection of a connection of the at least one network access point to a wireless communication device.

This may in particular be implemented in such a way that the luminaire and/or lamp is configured to switch on its lamp(s) or its light source(s) if the detection data indicate the presence of a person, and to switch off its lamp(s) or its light source(s) if the detection data do not indicate the presence of a person. In addition to this lighting function, the luminaire and/or lamp may also detect whether a wireless communication device is connected to it, due to its wireless network access point. As a result, in addition to its lamp control, the luminaire and/or lamp may be used to implement the method as described above.

In particular if a luminaire and/or lamp also features at least one presence detector, and this at least one presence detector corresponds to the group of presence detectors, the luminaire and/or lamp may advantageously be configured to allow the method as described above to run autonomously.

The object is also achieved via a luminaire, at least one presence detector which corresponds to the group of presence detectors, featuring at least one network access point which can be activated and deactivated by means of the luminaire, wherein the luminaire is wirelessly network-capable, independently of the network access point, and wherein the luminaire is configured to allow the method as described above to run autonomously.

The luminaire may be configured analogously to the method and the building infrastructure, and features the same advantages.

The object is achieved via a lamp, featuring at least one presence detector which corresponds to the group of presence detectors, featuring at least one network access point which can be activated and deactivated by means of the luminaire, wherein the luminaire is wirelessly network-capable, independently of the network access point, and wherein the luminaire is configured to allow the method as described above to run autonomously.

The lamp may be configured analogously to the method, the building infrastructure, or the luminaire, and features the same advantages.

BRIEF DESCRIPTION OF THE FIGURES

In the following, the illumination system described herein is explained in more detail in conjunction with non-limiting embodiments and the associated figures.

Elements which are identical, of identical type or act identically are provided with the same reference signs in the figures. The figures and the size relationships of the elements illustrated in the figures among one another should not be regarded as to scale. Rather, individual elements may be illustrated with an exaggerated size in order to enable better illustration and/or in order to afford a better understanding.

Description

Figure 1:
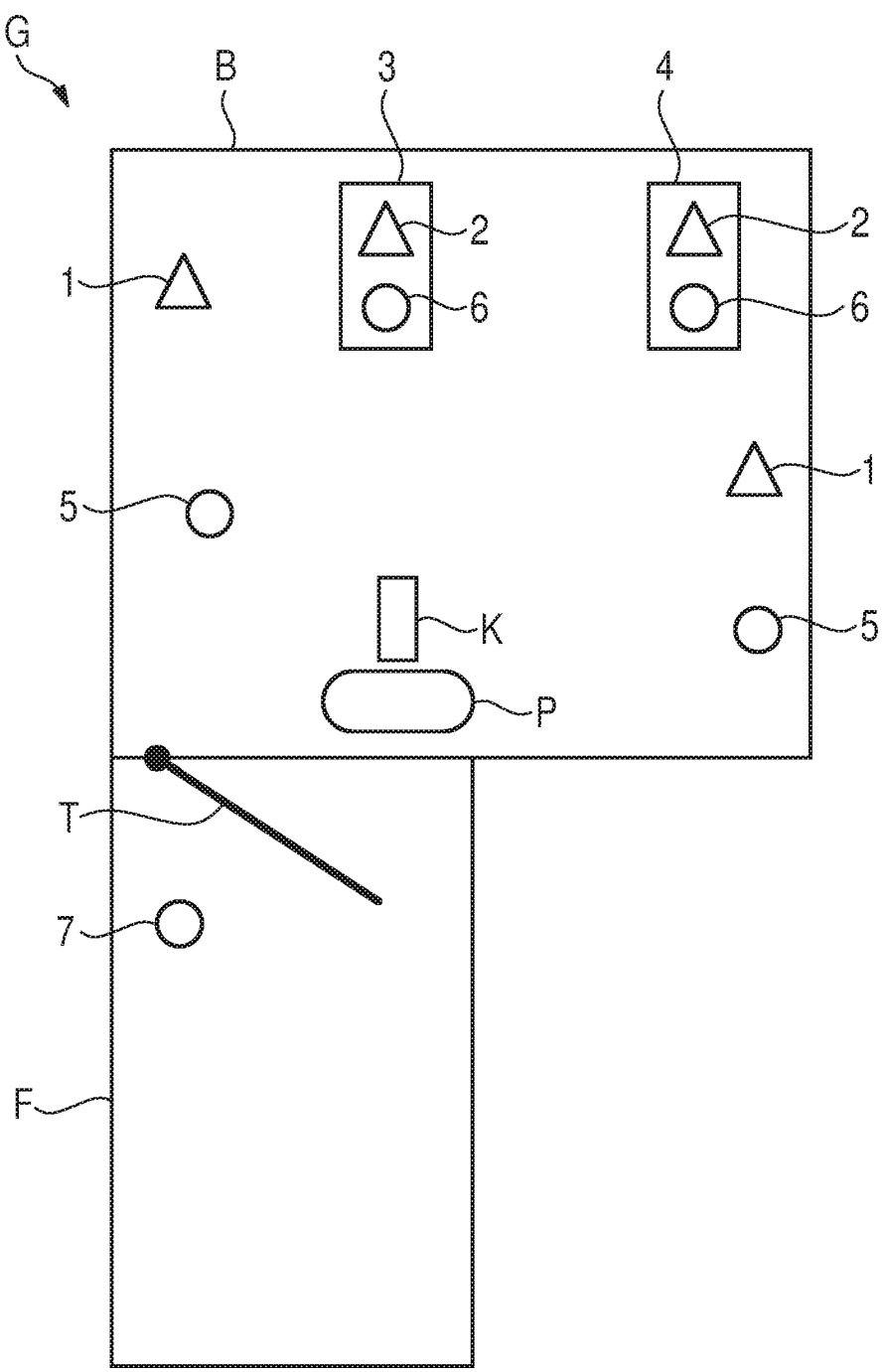
FIG. 1 depicts a top view of a section of a floor of a building including a plurality of wireless network access points of a building infrastructure which are installed therein.

FIG. 1 depicts a top view of a section of a floor of a building G, more precisely, an office space B and a corridor F leading to the office space B. The office space B and the corridor F are separable from one another via an entrance door T. Several network access points in the form of WLAN access points 1 and 2 are installed in the office space B. While the WLAN access points 1 are autonomous WLAN access points, the WLAN access points 2 are integrated into a luminaire 3 and a lamp 4.

In addition, presence detectors 5 and 6 are installed in the office space B. While the presence detectors 5 are autonomous detectors, the presence detectors 6 are integrated into the respective luminaire 3 or lamp 4. Here, the luminaire 3 and the lamp 4 feature both a respective WLAN access point 1 and 2 and a respective presence detector 5 and 6. In this case, the luminaire 3 and the lamp 4 are autonomously wirelessly network-capable, i.e., even if the WLAN access points 1 and 2 are deactivated. The WLAN access points 1 and the presence detectors 5 are also autonomously wirelessly network-capable.

Purely by way of example, a person P is in the office space B, who is carrying a wireless communication device K such as a smartphone or a notebook.

In addition to the presence detectors 5 and 6, another presence detector 7 is present in the corridor F, which monitors an area of the corridor F in front of the access door T and is autonomously wirelessly network-capable.

The presence detectors 5 to 7 form a group of presence detectors with which the WLAN access points 1 and 2 are associated. The luminaire 3, the lamp 4, and the presence detectors 5 and 7 are components of an illumination system of a building infrastructure. The WLAN access points 1 and 2 are also components of the building infrastructure, in particular of its IT network.

Figure 2:
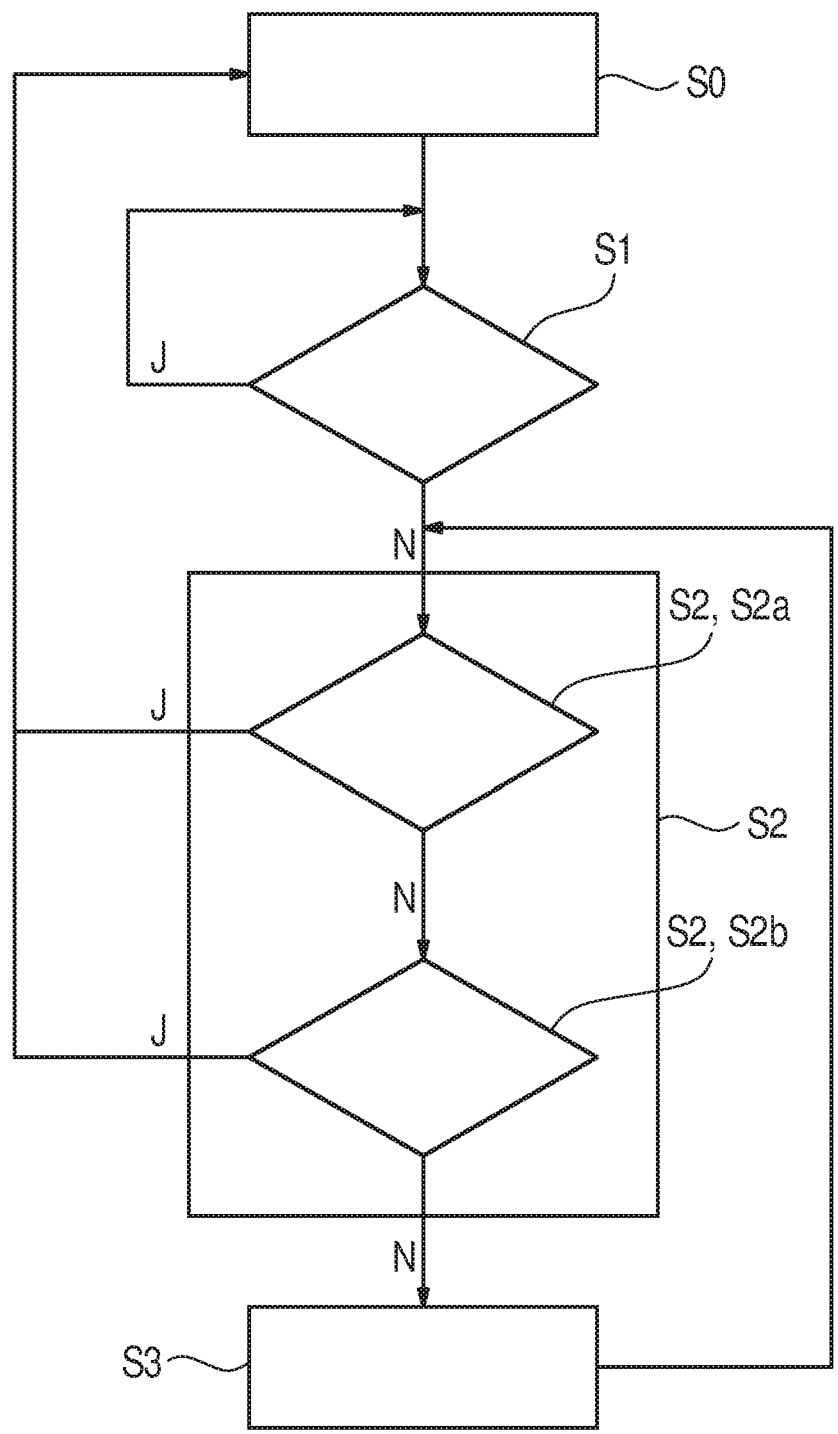
FIG. 2 depicts a possible flow chart of a method for carrying out a method for controlling wireless network access points.

FIG. 2 depicts a possible flow chart for carrying out a method for controlling the WLAN access points 1 and 2.

In this case, purely by way of example, it is assumed that at the start of the method, the WLAN access points 1 and 2 have initially been activated in a step S0.

In a following step S1 of the method, it is checked whether the WLAN access points 1 and 2 are connected to a wireless communication device K. If this is the case ("J"), this check is repeated. The WLAN access points 1 and 2 remain activated.

If, in step S1, a connection is no longer detected with any device K ("N"), subsequently, in a step S2, it is detected by the presence detectors 5 to 7 whether a person P is present. If this is the case ("J"), the method continues at step S0. If the WLAN access points 1 and 2 are already activated, nothing changes about their status. However, if they were deactivated, they are now activated.

In step S2, if no person P is detected by the presence detectors 5 to 7 ("N"), the method continues at step S3, in which the WLAN access points 1 and 2 are deactivated. The method then continues at step S2. This sequence S2-S3-S2 corresponds to a monitoring loop for the presence of a person P in the detection area of the presence detectors 5 to 7.

Optionally, step S2 may be divided into two substeps S2a and S2b which are similar to step S2, but which relate to different subgroups of the group of presence detectors 5 to 7. Thus, in step S2a, it may be checked by the presence detectors 5 and 6 whether a person P is present in the office space B. If this is the case ("J"), the method continues at step S0. If this is not the case ("N"), the method continues at step S2b.

In step S2b, the presence detector 5 and 6 checks whether a person P is in the corridor F in the vicinity of the door T. The presence of a person P there may be interpreted as a wish by the person P to enter the office space B, since said person has approached the door T. If this is the case ("J"), the method continues at step S0. If this is not the case ("N"), the method continues at step S3.

A control of the illumination system belonging to the building G ("light control") may be carried out in a manner similar to the control of the WLAN access points ("WLAN control"), without omitting step S1.

Figure 3:
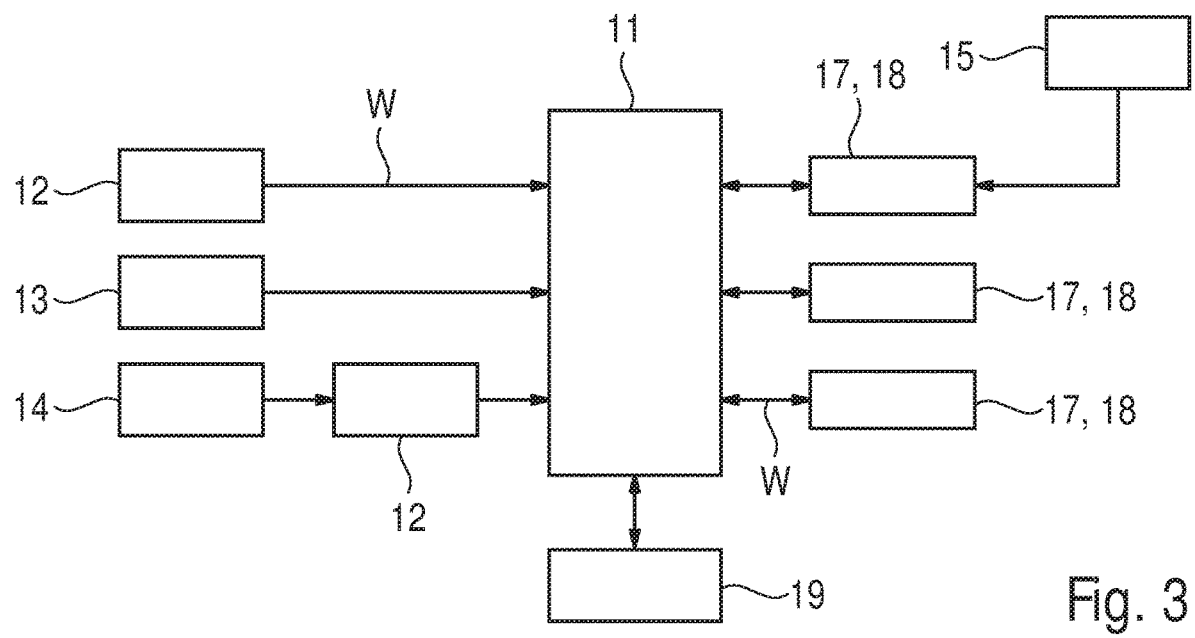
FIG. 3 depicts a first exemplary embodiment of a building infrastructure.

FIG. 3 depicts a first exemplary embodiment of a building infrastructure G1 having a central architecture. This building infrastructure G1 features a central entity in the form of a server 11 which is configured to assume both the light control and the WLAN control.

The server 11 is connected via a network W to various presence detectors 12, 13, 14, 15, which transmit their detection data to the server 11 via the network W. The presence detectors 12 to 15 may use identical or different sensors, for example, PIR sensors or cameras.

The presence detectors 12 and 13 are autonomously network-capable, for example, WLAN-capable. Here, the presence detector 14 is not autonomously network-capable, but is connected to the server 11 via a WLAN gateway 16.

The presence detector 15 is connected to an autonomous network-capable luminaire 17 and may even be integrated into said luminaire 17. The luminaire 17 features a WLAN adapter for connecting to the server 11 and thus acts as a gateway for the presence detector 15. Other luminaries 17 may be connected to the server 11. Furthermore, a WLAN access point 18 is integrated into each of the luminaires 17.

In addition, a user interface 19 may be connected to the server 11 in order to make settings, for example, in order to switch particular luminaires 17 on and off.

The presence detectors 12 to 15 may form a group with which the WLAN access points 18 are associated. The activation and deactivation of the WLAN access points 18 and the lighting function of the luminaires 17 is controlled by means of the server 11, based on the received detection data.

Figure 4:
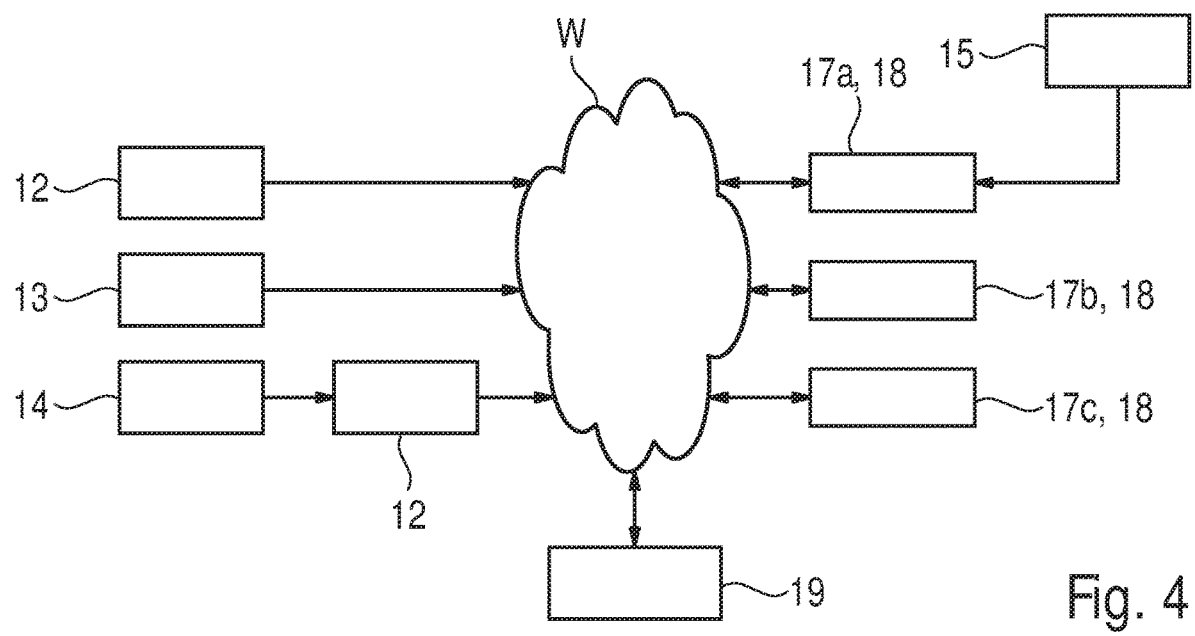
FIG. 4 depicts a second exemplary embodiment of a building infrastructure.

FIG. 4 depicts a second exemplary embodiment of a building infrastructure G2 having a decentralized architecture. Unlike the building infrastructure G2, there is no central entity here. Instead, the networked components are connected directly to one another via the network W and may thus, for example, form a peer-to-peer network.

In addition, here, purely by way of example, the luminaires 17a, 17b, 17c are present, which are all autonomously network-capable, but which support different controls. While the luminaire 17a is configured both for lighting control and for WLAN control, the luminaire 17b is configured only for WLAN control, and the luminaire 17c is configured only for lighting control.

In one scenario, at least one of the presence detectors, for example, the presence detector 12, may transmit detection data to the luminaire 17a via the network W. Said luminaire uses the detection data in order to carry out both a lighting control and a WLAN control.

For example, the luminaire 17a may transmit control commands to other, predetermined luminaires, for example, the luminaires 17b and 17c, in order to selectively switch on and switch off lamps or other light sources in these luminaires 17b, 17c, based on the detection data.

By means of the WLAN access point, the luminaire 17a may furthermore check whether a wireless communication device K is connected to it. The luminaire 17a may then transmit control commands to other, predetermined luminaires, for example, the luminaires 17b and 17c, in order to selectively switch on and switch off the WLAN access points 18 in these luminaires 17b, 17c, based on the detection data and the detection of a communication device K as described above.

Although the present invention has been illustrated and described in greater detail by the depicted exemplary embodiments, the present invention is not limited to them, and other variations may be derived therefrom by those skilled in the art, without departing from the scope of protection of the present invention.

Generally, "one", "a," etc. may be understood to mean a singular or a plural, in particular in the sense of "at least one" or "one or a plurality," etc., as long as this is not explicitly excluded, for example, by the expression "exactly one."

A number specification may also comprise exactly the specified number as well as a typical tolerance range, as long as this is not explicitly excluded.

LIST OF REFERENCE CHARACTERS

WLAN access point 1
WLAN access point 2
Luminaire 3
Lamp 4
Presence detector 5
Presence detector 6

Presence detector 7
Server 11
Presence detector 12
Presence detector 13
Presence detector 14
Presence detector 15
WLAN gateway 16
Luminaire 17
Luminaire 17a
Luminaire 17b
Luminaire 17c
WLAN access point 18
User interface 19
Office space B
Corridor F
Building G
Building infrastructure G1
Building infrastructure G2
Communication device K
Person P
Method steps S0 to S3
Access door T
Network W

The invention claimed is:

1. An illumination system comprising:
at least one group of presence detectors configured to detect the presence of a person;
at least one wireless network access point associated with the group of presence detectors; and
at least one central entity communicatively coupled to at least one group of presence detectors and to at least one network access point, and wherein the at least one central entity is configured to:
receive detection data of at least one presence detector in the group;
transmit control data to the at least one network access point; and
selectively activate and deactivate the at least one network access point based on the detection data and based on a detection of a connection of the at least one network access point to a wireless communication device;
wherein the illumination system is configured to carry out a method for controlling at least one wireless network access point in a building; wherein the method comprises:
detecting whether a wireless communication device is connected to the at least one wireless network access point and/or whether a person is present using a group of presence detectors, wherein the illumination system comprises the at least one wireless network point and/or the group of presence detectors;
wherein at least one of the following occur:
an activated network access point remains activated when the at least one wireless network access point is connected to a wireless communication device and/or when a person is present;
a network access point is automatically deactivated when the at least one wireless network access point is not connected to a wireless communication device and/or when a person is not present;
a deactivated network access point is automatically reactivated when the at least one wireless network access point is connected to a wireless communication device and/or when a person is present; and
combinations thereof.

2. The illumination system as claimed in claim 1, wherein the at least one network access point is situated in a room of the building and is activated when a person is detected in this room.

3. The illumination system as claimed in claim 1, wherein the at least one network access point is situated in a room of the building and is activated when a person approaches an entrance to the room from outside the room.

4. The illumination system as claimed in claim 1, wherein:
the group of presence detectors transmits detection data to a central entity, and
the central entity activates or deactivates the at least one network access point based on the received detection data.

5. The illumination system as claimed in claim 1, wherein:
the illumination system comprises at least one wirelessly communicating luminaire and/or at least one lamp, wherein the at least one wirelessly communicating luminaire and/or the at least one lamp comprises the wireless network access point, wherein the wireless network access point is activated or deactivated by the luminaire and/or the lamp;
the group of presence detectors associated with the network access point is configured to transmit detection data wirelessly to the at least one luminaire and/or the at least one lamp; and
the at least one luminaire and/or the at least one lamp selectively activates or deactivates the network access point.

6. The illumination system as claimed in claim 1, wherein the at least one network access point and at least a portion of the group of presence detectors are situated in a same room of a building.

7. The illumination system as claimed in claim 1, wherein a plurality of presence detectors, the at least one associated network access point, and a portion of the presence detectors are situated in the same room of a building, and another portion of the presence detectors is situated in an entrance area to the room.

8. The illumination system as claimed in claim 1, wherein the group of presence detectors and the at least one network access point are integrated into a peer-to-peer network.

9. The illumination system as claimed in claim 1, further comprising a luminaire and/or a lamp; wherein at least one presence detector is integrated into the luminaire and/or the lamp.

10. The illumination system as claimed in claim 1, further comprising a luminaire and/or a lamp; wherein at least one network access point is integrated into the luminaire and/or the lamp.

11. The illumination system as claimed in claim 10, wherein at least one luminaire and/or at least one lamp comprise a wireless network access point: wherein the at least one luminaire and/or the at least one lamp can be activated and deactivated by the luminaire and/or the lamp; wherein:
the group of presence detectors associated with the network access point is configured to transmit detection data wirelessly;
the luminaire and/or the lamp is configured to receive the detection data, the luminaire and/or the lamp is configured to detect whether a wireless communication device is connected to its respective wireless network access point; and
the luminaire and/or the lamp is configured to selectively activate and deactivate the wireless network access point.

12. A method for controlling at least one wireless network access point in a building, wherein the method comprises:
  detecting whether a wireless communication device is connected to the at least one wireless network access point and/or whether a person is present using a group of presence detectors, wherein an illumination system comprises the at least one wireless network point and/or the group of presence detectors, wherein the illumination system comprises at least one wirelessly communication luminaire and/or at least one lamp, wherein the at least one wirelessly communicating luminaire and/or the at least one lamp comprises the wireless network access point, wherein the wireless network access point is activated and/or deactivated by the luminaire and/or the lamp, wherein the group of presence detectors associated with the network access point is configured to transmit detection data to the at least one luminaire and/or the at least one lamp, and wherein the at least one luminaire and/or the at least one lamp selectively activates or deactivates the network access point;
  wherein at least one of the following occur:
    an activated network access point remains activated when the at least one wireless network access point is connected to a wireless communication device and/or when a person is present;
    a network access point is automatically deactivated when the at least one wireless network access point is not connected to a wireless communication device and/or when a person is not present;
    a deactivated network access point is automatically reactivated when the at least one wireless network access point is connected to a wireless communication device and/or when a person is present; and combinations thereof.

13. The method of claim 12, wherein the group of presence detectors associated with the network access point is configured to transmit the detection data wirelessly to the at least one luminaire and/or the at least one lamp.

14. A luminaire or lamp comprising:
  at least one presence detector;
  at least one network access point configured to be activated and deactivated by the luminaire,
  wherein:
  the luminaire or lamp is wirelessly network-capable, independently of the network access point, and
  the luminaire is configured to carry out a method for controlling at least one wireless network access point in a building, wherein the method comprises:
    detecting whether a wireless communication device is connected to the at least one wireless network access point and/or whether a person is present using a group of presence detectors, wherein an illumination system comprises the at least one wireless network point and/or the group of presence detectors;
    wherein:
    an activated network access point remains activated when the at least one wireless network access point is connected to a wireless communication device and/or when a person is present;
    a network access point is automatically deactivated when the at least one wireless network access point is not connected to a wireless communication device and/or when a person is not present;
    a deactivated network access point is automatically reactivated when the at least one wireless network access point is connected to a wireless communication device and/or when a person is present; and combinations thereof.

* * * * *